United States Patent [19]

Raniere et al.

[11] Patent Number: 4,910,085

[45] Date of Patent: Mar. 20, 1990

[54] MULTIPLE LAYER PACKAGING FILMS AND PACKAGES FORMED THEREOF

[75] Inventors: Jean E. Raniere, Huntington Beach; Steven L. Smith, Mission Viejo, both of Calif.; Russell P. Gehrke, Neenah; Richard E. Johnson, Jr., Appleton, both of Wis.

[73] Assignees: American National Can Company, Chicago, Ill.; Kendall McGaw Laboratories, Inc., Irvine, Calif.

[21] Appl. No.: 255,217

[22] Filed: Oct. 11, 1988

Related U.S. Application Data

[63] Continuation of Ser. No. 113,415, Oct. 27, 1987, Pat. No. 4,803,102, which is a continuation of Ser. No. 802,876, Nov. 29, 1985, abandoned.

[51] Int. Cl.$^4$ ............................................. B32B 27/36
[52] U.S. Cl. ................................... 428/412; 428/483; 428/476.3; 428/476.9
[58] Field of Search ............... 428/412, 483, 476.3, 428/476.9

[56] References Cited

U.S. PATENT DOCUMENTS

| | | | |
|---|---|---|---|
| Re. 28,688 | 1/1976 | Cook | 260/4 |
| 2,877,206 | 3/1959 | Scott | 260/45.5 |
| 3,299,174 | 1/1967 | Kuhre et al. | 260/876 |
| 3,424,649 | 1/1969 | Nyberg et al. | 428/516 X |
| 3,572,721 | 3/1971 | Harrison et al. | 372/218 |
| 3,663,240 | 5/1972 | Seiferth et al. | 99/174 |
| 3,689,595 | 9/1972 | Gwinn | 260/876 B |
| 3,701,702 | 8/1972 | Schichman | 156/244 |
| 3,850,474 | 11/1974 | Welch | 260/876 B |
| 4,104,210 | 8/1978 | Coran et al. | 268/897 A |
| 4,142,021 | 2/1979 | Dixon | 428/412 |
| 4,188,443 | 2/1980 | Mueller | 428/216 |
| 4,189,519 | 2/1980 | Ticknor | 428/476 |
| 4,210,686 | 7/1980 | Gajewski | 428/35 |
| 4,250,273 | 2/1981 | Bohm et al. | 525/99 |
| 4,322,465 | 3/1982 | Webster | 428/194 |
| 4,322,574 | 3/1982 | Bow et al. | 428/349 |
| 4,350,795 | 9/1982 | Bohm | 525/194 |
| 4,361,628 | 11/1982 | Krueger et al. | 428/475.8 |
| 4,397,916 | 8/1983 | Nagano | 428/461 |
| 4,399,249 | 8/1983 | Bildusas | 524/271 |
| 4,423,117 | 12/1983 | Machonis et al. | 428/475.8 |
| 4,440,815 | 4/1984 | Zomorodi | 428/35 |
| 4,456,646 | 6/1984 | Nishimoto et al. | 428/216 |
| 4,479,989 | 10/1984 | Mahal | 428/35 |
| 4,486,497 | 12/1984 | Mizutani | 428/332 |
| 4,568,723 | 2/1986 | Lu | 525/92 |
| 4,572,852 | 2/1986 | Gartland et al. | 428/35 |
| 4,588,648 | 5/1986 | Krueger et al. | 428/475.8 |
| 4,617,240 | 10/1986 | Krueger et al. | 428/476.1 |
| 4,643,926 | 2/1987 | Mueller | 428/35 |
| 4,769,261 | 9/1988 | Hazelton et al. | 428/35 |

FOREIGN PATENT DOCUMENTS

| | | | |
|---|---|---|---|
| 120453 | 7/1984 | Fed. Rep. of Germany | 428/476.9 |
| 1629791 | 7/1984 | Fed. Rep. of Germany | |
| 25748 | 2/1985 | Japan | 428/476.9 |

OTHER PUBLICATIONS

Kraton, Technical Literature from Shell Chemical re SEBS Polymer.

*Primary Examiner*—Edith Buffalow
*Attorney, Agent, or Firm*—Thomas D. Wilhelm; Paul R. Audet

[57] ABSTRACT

The invention discloses a multiple layer film useful in packaging, and the packages made therefrom. A first layer of the film is a material containing an ester group, a polycarbonate or a polyether block amide copolymer. A second layer of the film is a sealant, preferably polypropylene polymer blended with an elastomeric styrene ethylene butylene styrene copolymer. A third functionally adhesive layer is between the first and second layers. The composition of the third adhesive layer is typically either a polypropylene modified with a carboxy group such as an organic acid or anhydride or a styrene ethylene butylene styrene copolymer.

13 Claims, 1 Drawing Sheet

MULTIPLE LAYER PACKAGING FILMS AND PACKAGES FORMED THEREOF

This is a continuation of application Ser. No. 113,415, filed Oct. 27, 1987 which is a continuation of application Ser. No. 802,876, filed Nov. 29, 1985, now abandoned.

BACKGROUND OF THE INVENTION

This invention pertains to packaging, particularly to packaging liquid in sealed flexible pouches, or bags, where excellent visibility of the contents is desired. A particular utility for such packaging is in its use for packaging powders, liquids and solutions used for medical services. It is deemed important that the package be strong, including any seals, to prevent contamination, or loss of the liquid product. The packaging material should have excellent clarity for observation of the liquid product. The packaging material should provide resistance to transmission of moisture vapor. The packaging material should be highly flexible without cracking or stress cracking. Further, the package should be resistant to abuse such as by abrasion, by shock impact, or by penetration. Finally, since some medical liquids and solutions are processed at high temperatures of up to about 250° F., it is important that the packaging material be able to tolerate such processing temperature without adverse affect.

Liquids and solutions for medical use have been packaged in glass bottles and in bags made from polyvinyl chloride with some degree of success. But these packages tend to be somewhat deficient, particularly in abuse resistance, moisture barrier and flexibility. However, no better packaging material has been available, and so PVC and glass have continued to be used.

It is an object of this invention to provide an improved multiple layer film for use in packaging.

It is an object to provide an improved film which is useful in packaging liquids and solutions.

It is yet another object to provide such a film which is highly tolerant of high temperature processing and which shows excellent tolerance of abuse such as abrasion, shock or penetration.

It is a further object to provide improved packages made from multiple layer films, wherein the packages are useful for packaging liquids and solutions which may be subject to high temperature processing and to abusive handling or other use.

Finally, it is an object to provide improved closed and sealed packages which have been subjected to high temperature processing at up to about 250° F. for up to about 30 minutes. These packages should not be unacceptably adversely affected by the processing and should retain their excellent properties of clarity, flexibility, and integrity. As used herein, the term "package" refers to containers of all types, including pouches.

SUMMARY OF THE DISCLOSURE

These and other objectives are achieved in multiple layer films of the invention. A first layer is made of an abuse resistant material, preferably containing ester groups, such as polyesters [e.g., polyethylene terephthalate (PET) and polybutylene terephthalate PBT)] and copolyesters [e.g., glycol modified polyethylene terephthalate (PETG) and PCCE 9967]. Hereafter such ester containing materials are sometimes referred to as "EGM's". Alternatively, the material of the first layer may be a polycarbonate ("PC") or polyether block amide copolymer (PEBA). A second sealant layer preferably has a composition of a first component of a polypropylene and a second component of a styrene ethylene butylene styrene copolymer (SEBS). A third layer of an adhesive is positioned between, and adhered, in face-to-face contact, to the first and second layers. Where the first layer is an EGM, the preferred adhesive is styrene ethylene butylene styrene copolymer. A carboxy modified olefin (e.g., where the olefin may be polypropylene), is a preferred alternative adhesive where the composition of the first layer is PEBA because the carboxy modified adhesive gives higher levels of adhesive than does SEBS. In preferred ones of the carboxy modified polypropylene adhesives, the carboxy modification is an organic anhydride.

In order to achieve the combination of properties of high temperature tolerance and abuse tolerance, the composition of the second layer is preferably a blend of about 40% by weight to about 90% by weight of the polypropylene and about 60% by weight to about 10% by weight of the styrene ethylene butylene styrene copolymer.

The films of the invention are readily useful for making packages and pouches, especially by the use of heat seals in package formation and closure. For those packages having high fractions of polypropylene in the second layer, the packages are tolerant of high temperature processing, especially up to at least about 250° F. for a period of up to at least about 10 minutes, preferably at least about 30 minutes.

DETAILED DESCRIPTION OF THE DISCLOSURE

Figure 1:
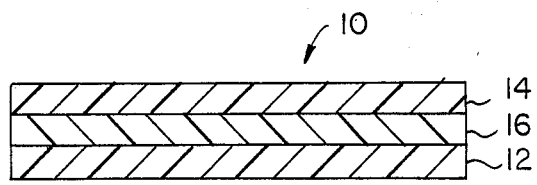
FIG. 1 is a cross-section of a portion of a representative multiple layer film of this invention.

The details of the invention are most easily seen and understood in relation to the drawings. In FIG. 1, the overall multiple layer film is designated at 10. The composition of layer 12 is a combination of polypropylene and SEBS. Layer 14 is an abuse resistant polymer composition. Layer 16 is an adhesive material capable of joining layers 12 and 14 with good adhesion.

Figure 2:
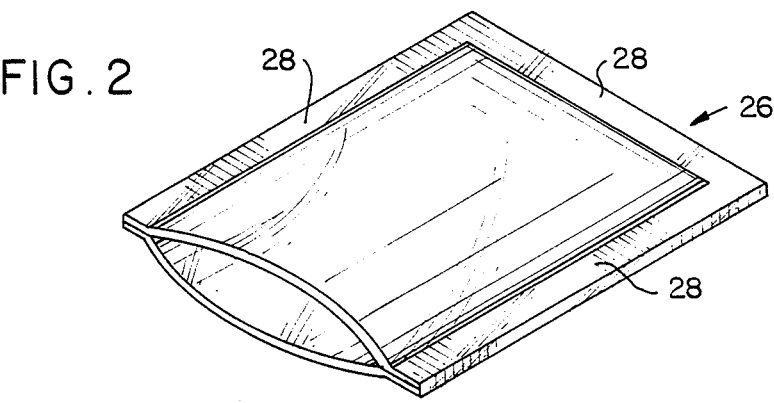
FIG. 2 is a pictorial view of an open package of this invention which is formed from multiple layer film of this invention.

FIG. 2 shows a pouch-type package made from multiple layer film of the invention such as that seen in FIG. 1. The package is made by first bringing portions of the film 10 into facing relationship, with layers 12 of the portions facing each other. The enclosure is formed by forming seals as at 28 about the common periphery of the facing films, and leaving one side open for access as seen in FIG. 2. As shown, layers 12 form the inside surface of the package, and the layers 14 generally form the outside surface of the package.

Figure 3:
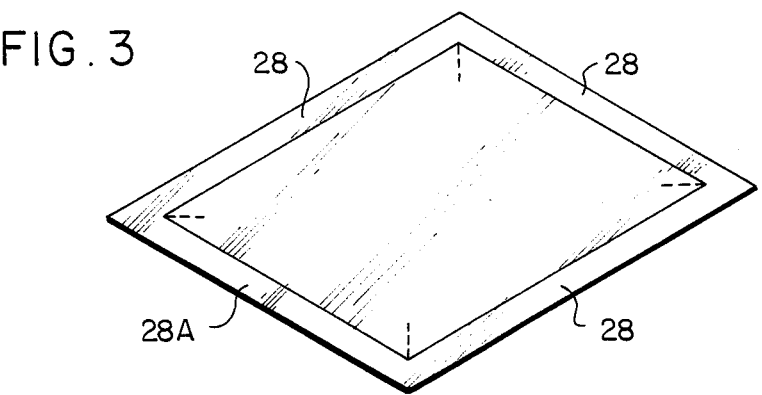
FIG. 3 is a pictorial view of a closed and sealed package of this invention which is formed from multiple layer film of this invention.

The closed package of FIG. 3 is representative of packages of the invention after the final seal 28A has been made.

Alternately, the sheet may be formed into a tube by forming a longitudinal seal along overlapping edges; and a transverse seal is also formed across the width of the tube; all as described, for example, in U.S. Pat. No. 4,521,437, herein incorporated by reference. This process is particularly suitable for use in vertical form, fill and seal machines.

The functioning of films and packages of the invention is dependent on the ability of each layer to perform its functions, and the ability of the combined layers to act together. In preferred embodiments, layer 12 serves primarily the function of a heat seal layer. Again in preferred embodiments, the primary function of the layer 14 is to protect the package from external abuse at the package surface, such as by abrasion, cutting, or puncture. Finally, the primary function of layer 16 is to serve as an adhesive to join layers 12 and 14 to each other. The combined effect of the layers is a multiple layer film having strong resistance to external abuse, tolerance for high process temperatures, good unitary identity provided by good interlayer adhesion, and strong heat seals when formed into a package. Those embodiments having copolyester in the first layer, further, have improved clarity.

A preferred minimum thickness for layer 12, for achieving strong heat seals, is about 1 mil; so that is a preferred minimum thickness. Thicker heat seal layers usually provide more efficient use of the heat seal material, up to about 10 mils; and that is a generally preferred maximum thickness. While layer 12 may be thicker, and same is encompassed by the scope of the invention, no material benefit is usually seen to be derived from the use of the additional material; so that greater thicknesses are not generally preferred.

Polypropylene is advantageously used in layer 12 because of the combination of properties whereby it forms strong heat seals, provides contribution to impeding moisture vapor transmission and is tolerant of high temperatures to which a package may be subjected as in retort processing of up to at least about 250° F. for up to at least about 30 minutes. While these properties of polypropylene are advantageous and favorable to its use, its brittleness is disadvantageous. This property is particularly of concern because the packages are subjected to high temperature processing, the packaging having polypropylene layers without SEBS blended therein exhibit increased brittleness after the high temperature processing. And because the polypropylene is present as such a significant proportion of the package composition, the brittleness of the polypropylene tends to strongly influence the overall brittleness of the package. The overall brittleness of a package is, of course, a property which is a composite of the brittlenesses of the individual layers, interfacial bond strengths, the elasticity of adjacent layers, and their capability to absorb and dissipate physical shock; and any overwhelming brittleness of any one layer. The composite brittleness of packages may generally be observed as the fraction of the filled and sealed packages which fail after being subjected to physical stress or shock.

In overcoming the problem of brittleness of the polypropylene in packages of the invention, a number of factors work together in combination. Important to achievement of the objectives of the invention is incorporation into the layer 12 composition of the elastomeric SEBS polymer.

Another factor in controlling the brittleness of layer 12, and thus, in large part, the brittleness of the package, is in selection of the particular polypropylene to be used in the layer 12 composition. While any of the polypropylenes may be used as the first component of the blend, polypropylenes which are copolymers having about 2 to about 8 mole percent ethylene are preferred. The copolymer, itself, provides some minimum level of additional resilience in the polypropylene, as compared to a homopolymer. The term "polypropylene" as used herein is intended to include homopolymers and copolymers except where specified otherwise. Whether the polypropylene is a homopolymer or a copolymer, its resilience, whether having been retort processed, or not retort processed, is enhanced substantially by the incorporation of the SEBS component. Without the incorporation of the SEBS, the polypropylene is at least somewhat brittle, whether homopolymer or copolymer, and is not successufily functional as are films of the invention which have copolymer therein in layer 12.

While the incorporation of virtually any amount of SEBS into the layer 12 composition will provide some benefit, generally, improvements in the functional performance of the 3-layer film are detected at a level of about 2% by weight of the SEBS in the layer 12 composition. And while up to about 90% SEBS may be used in the layer 12 composition, the most desired balance of properties is achieved when the SEBS is present in layer 12 in an amount of about 10% to about 35%.

PEBA copolymers useful in layer 14 of this invention contain blocks of polyamide and polyether moieties in the polymer chain. A general formula for those polymers is:

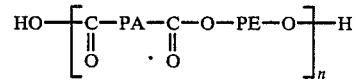

PA = polyamide
PE = polyether

The polyamide component may be any of the conventional polyamides, such as nylon 6, nylon 66, nylon 6/66, nylon 6/36, nylon 11, and nylon 12. The polyethyer component is usually, but not necessarily, selected from polyoxyethylene, polyoxypropylene, and polyoxytetramethylene. The melting point of known PEBA's is about 248° F. to about 402° F., and the Shore Hardness is about 25D to about 63D. Preferred PEBA's are sold by Ato Chemie under the tradename PEBAX. Typical of Ato Chemie's polymer resins is PEBAX 4033 which has a melting point of about 334° F. and Shore Hardness of about 40D. Other known commercially available PEBA's are PEBAX 5512 and PEBAX 3533. PEBAX 5512 has a melting point of about 383° F. and a Shore Hardness of about 55D. PEBAX 3533 has a melting point of about 306° F. and a Shore Hardness of about 35D.

A selected PEBA should have a softening point temperature above the maximum temperature to which it will be exposed during its expected life. Thus, where the film will be subjected to retort processing, as at about 250° F., the selected PEBA should have softening point temperature above about 250° F.

As indicated above, a highly preferred composition for layer 14 is EGM, and especially a soft copolyester. Softer materials are preferred in layer 14 because films made with them are more flexible. A highly preferred, and softer, and especially clear, copolyester is available from Eastman Kodak Company, of Rochester, N.Y. as Eastman PCCE 9967. PCCE 9967 is glycol modified cyclohexanedimethanolcyclohexanedicarboxylate. Layer 14 can also contain PC.

By virtue of the interdependence of the several layers on each other for the overall functional performance of the multiple layer film, especially as regards shock abuse, for a given level of functional performance, selection of the specific materials for layer 14 is somewhat dependent on the composition of sealant layer 12. To the extent sealant layer 12 has a high level of resilience by use of polypropylene copolymer, rather than homopolymer, a harder, and thus tougher, material may be selected for layer 14. Where layer 12 has a lower level of resilience, the material chosen for the composition of layer 14 may be softer, thereby obtaining some added resilience for the multiple layer film, albeit at a possible reduction in abuse resistance for layer 14. Thus can the composition of layers 12 and 14 be adjusted somewhat to compensate one for properties of the other, while achieving the overall desired results for the film as a whole.

Typical of some of the materials used for adhesive layer 16 are the carboxy modified polymers sold by Norchem as Plexars, by DuPont as CXA's and by Mitsui Petrochemical as the Admer series. Where layer 12 has a high fraction of polypropylene, and layer 14 is PEBA, suitable materials for use in layer 16 are carboxy modified polypropylenes such as Admer QF-500, QF-550 and QF-551. Where layer 14 is an EGM, particularly favorable material for use in layer 16 is an SEBS. Where adequate adhesion is achievable, SEBS is generally preferred over carboxy modified polymers because of its better acceptance by regulators of food and drug substances and packaging therefore. The selection of the adhesive polymer for layer 16 is limited only by the functional requirement that it have good adhesion, after retort, to layers 12 and 14 in the multiple layer film.

Overall, the thickness of the three layers of the films of the invention usually ranges from about 1.5 mils to about 20 mils, with a preferred range of about 6 mils to about 12 mils. At the lower limit of about 1.5 mils, layer 12 is at its usually minimal effective thickness of about 1 mil. Layer 14 is about 0.4 mil, which is about its minimal effective thickness for providing abuse resistance. Layer 16 at about 0.1 mil is essentially just thick enough to form a continuous layer. And while a film about 1.5 mils thick is functional for applications requiring minimal abuse tolerance, higher levels of strength are usually preferred.

Toward the thicker end of the thickness range, films thicker than about 20 mils tend to be less flexible due to the overall film thickness, and thus are not preferred.

Preferred films are those having a thickness of about 6 to about 12 mils, especially about 8 mils. Within this preferred family of films, preferred ratios of the layers to the overall thickness of the three layer composite are about 60% to about 85% layer 12, about 5% to about 30% layer 14, and about 10% layer 16. A highly preferred film is about 77% layer 12 as a blend of PPE and SEBS, about 13% layer 14 as copolyester, and about 10% layer 16 as SEBS.

EXAMPLE 1

A composition is selected for layer 12 which is about 80% polypropylene and about 20% styrene ethylene butylene styrene copolymer. The composition selected for layer 14 is PEBAX 4033. The composition selected for layer 16 is Admer QF-550. Using the selected materials, a three layer film as in FIG. 1 is coextruded using three extruders and a multiple layer combining slit die, to form a three layer film. The throughput at the die is so adjusted that the overall layer ratios are about 70% layer 12, about 20% layer 14, and about 10% layer 16. Overall thickness of the film is about 10 mils.

EXAMPLE 2

A three layer film is made as in EXAMPLE 1 except that Admer QF-551 is substituted for Admer QF-550.

EXAMPLE 3

A three layer film is made as EXAMPLE 2 except that the layer ratios are about 80% layer 12, and about 10% each for layers 14 and 16.

EXAMPLE 4

A three layer film is made as in EXAMPLE 2 except that the overall thickness of the film is about 8 mils and the layer ratios are about 77.5% layer 12, about 12.5% layer 14 and about 10% layer 16.

EXAMPLE 5

A three layer film is made as in EXAMPLE 2 except that the overall thickness of the film is about 8 mils and the layer ratios are about 65% layer 12, about 25% layer 14 and about 10% layer 16.

EXAMPLE 6

A three layer film is made as in EXAMPLE 1 except that PEBAX 5512 is used in place of PEBAX 4033.

EXAMPLE 7

A three layer film is made as in EXAMPLE 1 except that SEBS is used in layer 16 in place of Admer QF-550.

EXAMPLE 8

A three layer film is made as in EXAMPLE 1 except that PCCE 9967 is used in layer 14 in place of PEBAX 4033 and SEBS is used in layer 16 in place of Admer QF-550, with the layer ratios being about 77.5% layer 12, about 12.5% layer 14 and about 10% layer 16. The overall thickness of the film was about 8 mils.

The films made in EXAMPLES 1–8 are made into heat sealed pouches. The pouches all have good clarity, strength, abuse and shock tolerance, and tolerance of high temperature processing conditions at about 250° F. for about 30 minutes. The pouches of EXAMPLE 8, using PCCE 9967, have the best clarity.

It is appreciated that additional layers may be added to the three layer films of the invention to thereby impart additional or improved functional properties to the films, or to adapt them to other uses.

This it is seen that the invention provides multiple layer films and packages which have a combination of tolerance for significant shock abuse, as well as tolerance of high temperature processing. The films and packages exhibit good heat seal capability and excellent clarity, and good barrier to transmission of moisture vapor. Further, the packages are excellent for containing liquid products which need protection from abuse and contamination by the outside environment and are especially suitable for containing medical solutions.

Having thus described the invention, what is claimed is:

1. A multiple layer film, comprising:
   (a) a first layer, the composition of said first layer being selected from the group consisting of polyesters, copolyesters, polycarbonates, and polyether block amide copolymers;

(b) a second sealant layer comprising (i) a first component of a polypropylene and (ii) a second component of a styrene ethylene butylene styrene copolymer; and
(c) a third adhesive layer adhering said first layer to said second layer, said third layer being positioned between said first and second layers, and in surface-to-surface contact with said first layer, the composition of said third adhesive layer comprising a carboxy modified propylene.

2. A multiple layer film comprising:
(a) a first layer, the composition of said first layer being selected from the group consisting of polyesters and copolyesters;
(b) a second sealant layer; and
(c) a third adhesive layer adhering said first layer to said second layer, said third layer being positioned between said first and second layers, and in surface-to-surface contact with said first layer, the composition of said third adhesive layer comprising a carboxy modified polypropylene.

3. A multiple layer film as in claim 2 wherein said first layer comprises a glycol modified cyclohexanedimethanolcyclohexanedicarboxylate, a copolyester.

4. A multiple layer film as in claim 1 wherein the composition of said second sealant layer comprises a combination of about 40% by weight to about 90% by weight of said polypropylene and about 60% by weight to about 10% by weight of said styrene ethylene butylene styrene copolymer.

5. A package made from a multiple layer film of claim 1.

6. A package made from a multiple layer film of claim 2.

7. A package made from a multiple layer film of claim 3.

8. A package made from a multiple layer film of claim 4.

9. A package as in claim 5, said package having been subjected to processing conditions of about 250° F. for a period of at least about 10 minutes.

10. A package as in claim 6, said package having been subjected to processing conditions of about 250° F. for a period of at least about 10 minutes.

11. A package as in claim 7, said package having been subjected to processing conditions of about 250° F. for a period of at least about 10 minutes.

12. A package as in claim 8, said package having been subjected to processing conditions of about 250° F. for a period of at least about 10 minutes.

13. A package as in any one of claims 5, 6, 7, 8, 9, 10, 11, or 12 wherein said package is adapted to contain medical products including liquids and powders.

* * * * *